United States Patent [19]

Borland

[11] Patent Number: 4,663,189

[45] Date of Patent: May 5, 1987

[54] CERAMIC MULTILAYER ELECTRICAL CAPACITORS

[75] Inventor: William Borland, Gloucester, England

[73] Assignee: Engelhard Corporation, Menlo Park, N.J.

[21] Appl. No.: 711,939

[22] Filed: Mar. 15, 1985

Related U.S. Application Data

[62] Division of Ser. No. 529,417, Sep. 6, 1983, Pat. No. 4,520,422.

[51] Int. Cl.4 .............................................. B05D 5/12
[52] U.S. Cl. ..................................... 427/79; 427/123; 427/125; 75/251; 420/505; 420/463
[58] Field of Search .......................... 427/79, 123, 125; 75/122.1, 251

[56] References Cited

U.S. PATENT DOCUMENTS

| | | | |
|---|---|---|---|
| 2,363,769 | 11/1944 | Zipper | 29/78 |
| 2,608,539 | 8/1952 | Bain | 252/514 |
| 3,385,799 | 5/1968 | Hoffman | 252/514 |
| 3,784,887 | 1/1974 | Sheard | 361/321 |
| 4,192,698 | 3/1980 | Maher et al. | 156/89 |

FOREIGN PATENT DOCUMENTS 1004653  2/1964  United Kingdom .

Primary Examiner—Richard Bueker

[57] ABSTRACT

Ceramic multilayer capacitors are prepared having a reduced metal content in the electrode by the use of finely-divided metal alloy flaked particles.

5 Claims, No Drawings

CERAMIC MULTILAYER ELECTRICAL CAPACITORS

This is a division of application Ser. No. 529,417 filed Sept. 6, 1983, now U.S. Pat. No. 4,520,422.

This application related to ceramic electrical capacitors and techniques to produce these wherein the metal content of the electrode is greatly reduced as compared to prior capacitors. More specifically, it relates to ceramic multilayer capacitors and ceramic multilayer chipped capacitors.

Currently, capacitors are manufactured by screen printing techniques which include the use of an ink composition of metal powders that is liquid at room temperature and which is screen printed onto a dielectric base on a substrate. Examples of this printing technique are illustrated in U.S. Patents such as U.S. Pat. No. 2,694,016, 2,819,170, 2,822,279, 2,924,540, 3,052,573, 3,089,782, 3,207,706, 3,232,886, 3,390,981, 3,586,522, 3,620,714, 3,652,332, 3,674,515, 3,770,496, 3,817,758, 3,838,071, 4,243,710. These patents all deal with making capacitors and improving the preparation of such capacitors by modifying the printing ink or printing techniques.

Other attempts at improving capacitors have dealt with modifying the metal composition of the electrode portion. For example, U.S. Pat. No. 3,872,360 utilizes a nickel or nickel alloy in conjunction with a noble metal. Others have modified the dielectric material with dopants. Still further attempts at improving capacitors may be found in such patents as U.S. Pat. No. Re. 26,421, U.S. Pat. Nos. 3,909,327, 4,297,773 and the like. In contrast to these prior art improvements, the present invention provides improved capacitors by modifying the physical characteristics of the metal alloy flaked particles to be used as the electrode.

Previous attempts at producing alloys for use as the electrode have been accomplished by mixing individual metal powders to attempt to alloy the metals during the firing step of the capacitor manufacture, or by attempting to co-precipitate the metals once upon the other. Both of these techniques, however, result in extensive amounts of non-alloyed material being present in the electrode. The present invention, to the contrary, in one embodiment, provides for starting with an alloy which results in a powder consisting essentially of particles of alloy rather than a mixture of particles of the various constituents of the desired alloy.

Specifically, the present invention utilizes metal particles having high surface areas and relatively small particle sizes. Generally, an alloy of the desired composition is first formed, shavings thereof are made, and the resultant shavings milled to obtain the desired particle size and shape. By following the procedure of the present invention, the amount of metal required to form reproducibly consistent electrodes and capacitors is greatly reduced, i.e., from about 14 to 20 milligrams per square inch to less than about 12, preferably less than about 10, and more preferably less than about 9 milligrams per square inch thereby effecting an enormous savings of the expensive noble metals used to form the electrodes. Furthermore, the present procedure when used with a palladium-silver alloy can preclude the presence of free palladium. Free palladium may have a deleterious chemical or catalytic effect upon the other components of the capacitor. It is accordingly an objective of the present invention to produce capacitors having electrodes wherein the metal content is less than about 10 milligrams per square inch.

It is another objective of this invention to provide a capacitor wherein the electrode is prepared from a metal bar which is then shaved and the shavings milled (such as in a ball mill) to a reduced size to reduce the amount of such metal needed to form the electrode. It is still a further objective of the present invention to produce capacitors by using high surface area metal particles. Other objectives will be apparent from the description hereinafter.

Capacitors are conventionally formed by printing a specific electrode pattern onto the surface of a dielectric material. Thereafter, a multilayer sandwich having alternating layers of the dielectric material and the electrode material is formed. The electrode materials in the sandwich are of alternating polarity, i.e., they run from the marginal edge on one side, terminating at a position short of the opposite marginal edge in an alternating fashion. Thereafter, the sandwiches are fired to give optimum densification, for example, at about 1000°–1500° C. for times of minutes up to several hours. Thereafter, the electrode ends are exposed, a suitable conductive material such as a silver paste or the like is applied to afford contact between similar electrodes, and terminal leads are attached to the contacts by soft solder or the like.

The ceramic dielectric material as used herein may be any such material conventionally used in the art including, for example, calcium and barium titanate and zirconate optionally mixed with binders such as polyvinyl alcohol, deflocculants and various dopants, all as is well known in the art. A particularly suitable dielectric material is barium titanate, which is especially advantageous when used with palladium-silver alloy particles.

The electrode material used in the present invention is formed by starting with the desired metal or alloy composition to be used in said electrode. Suitable such metals include palladium, silver, platinum and gold and alloys of two or more of such metals. Especially suitable for use herein are silver-palladium alloys, particularly those containing 10–90 percent by weight silver and 90–10 percent by weight palladium. Two of the most widely used alloys contain 70 percent silver, 30 percent palladium and 20 percent silver, 80 percent palladium. While this invention is directed primarily to the use of alloys in capacitors, essentially pure individual metals may also be utilized in accordance with the techniques herein disclosed. Thus, if a capacitor manufacturer wished to use only silver platinum, palladium or the like, in the electrode, the present technique will greatly reduce the amount of metal needed to form the electrodes over previous methods of preparation.

The metal particles used to form the electrodes herein are prepared by forming an ingot having the desired metal composition. Then the ingot is shaved to produce shavings. The shavings must be sufficiently pliable to be further reduced in the subsequent milling step. Generally, this means that the shavings should have a thickness of less than about two mils, preferably about 0.5–1.5 mils, as measured with a point micrometer. The size of the cutter in the shaving machine as well as the shaving machine parameters such as feed rate, depth of cut, spindle rpm and the like are selected to give the desired thickness and will, of course, vary depending upon the particular metal being utilized, the production rate desired, and the desired metal content of the capacitor.

The shavings produced by the shaving machine are then milled in a mill such as a ball mill along with a suitable solvent and a lubricant for the sufficient time to produce the flaked particle having a reduced average diameter, i.e., less than about 5 microns on average, and to increase the surface area of said particles to greater than about 1 square meter per gram, preferably about 1–7 and most preferably about 1–5 square meters per gram. Higher surface areas have not been found to be detrimental. Generally, the mill will contain about 25–75 parts of shaving per 10–50 parts solvent per 1 part of lubricant. A particularly preferred ratio has been found to be about 35–45 parts of shavings per 20–30 parts of solvent per 1 part lubricant. The material is milled preferably in an acid resistant, i.e., stainless steel, ball mill for an extended period of time, i.e., up to about 300 hours, though longer times may be needed depending upon the metal used, to form flake particles.

The solvent is used to form a slurry and maintain separation of the particles. Suitable such solvents include commercially available aromatic solvents with flash points over 100° C. These include Aromatic 150 from Central Solvent Company, Shellsolve AB from Shell Chemical Company and the like.

The lubricant is used to prevent the metal particles from sticking together and from being milled into larger particles after the desired small particle size has been obtained. It also serves to promote the formation of a slurry in which the milled flake particles remain suspended which aids in removing the milled flakes after the milling step is completed. Suitable such lubricants include stearic acid, oleic acid, amine dioleates, silver stearate and the like. Stearic acid has been found to be especially useful with an alloy composition of 30 percent palladium, 70 percent silver.

Thereafter, the milled flake slurry is removed from the mill, the metal flakes are allowed to settle for several hours and the liquor decanted. Thereafter, a low boiling point solvent, i.e., having a flash point below the drying temperature to be used, generally below about 100° C., is used to wash the flakes to remove as much of the lubricant as possible. Suitable such solvents include Varsol 3, toluene, benzene, and the like. This washing process may then be repeated as many times as necessary to remove as much of the lubricant as possible. The milled metal flakes are then dried and tumbled in a blender to break down any agglomerates which may have formed. Finally, the material is air classified to the desired size distribution. Any course material which has resulted can be removed from the air classifier and returned to the mill for further particle size reduction. The resultant flaked powder most preferably should have a surface area in the range of about 1.5 to 4.5 square meters per gram and a tap density of from about 1.0 to 3.0 grams per cc. In certain preferred embodiments, the individual particles are substantially planar and have an average diameter of about 5 to 100, preferably 10–50, times the thickness. Generally, the thickness will be less than about 1 micron, preferably in the range of about 0.05 to 0.7 microns, and most preferably about 0.1 to 0.5 microns.

This material is then ready to be made into an ink for use in forming the internal electrode for multi-layer capacitors. The formulas for such inks vary depending upon the particular manufacturer of the capacitor, the dielectric material utilized by such manufacturer, the drying rates required for a particular process, the amount of shrinkage of the dielectric materials during firing and the like.

In the following non-limiting examples, all parts and percentages are by weight.

EXAMPLE I

An electrode for use in a 0.1 microfarad capacitor is prepared as follows: an ingot of 30 percent palladium and 70 percent silver is formed. It is then shaved to produce shavings having an average thickness of about 1 mil. The shavings are then loaded into a conventional ball mill utilizing 42 parts of shavings per 25 parts of an aromatic solvent (Aromatic 150) per 1 parts of stearic acid lubricant. This mixture is then ball milled with stainless steel balls at about 40 rpms for 250 hours. The resultant slurry is removed from the mill and the milled metal flakes are allowed to settle overnight. The liquor is decanted and thereafter the metal flakes are washed with a low boiling point solvent, Varsol 3, by merely adding the solvent to the milled metal flakes and stirring for 20 to 30 minutes. Thereafter the metal flakes are allowed to settle and the liquor is decanted. This wash process is repeated two more times. The metal flakes are then dried in a steam kettle and the dried cake broken up and tumbled in a V-blender to break down any agglomerates. Finaly, the material is air classified to remove particles larger than about 5 microns.

The resultant particles are then formulated into a suitable admixture containing about 50 parts by weight of metal particles and about 50% by weight of a commercial ink formulation containing ethylhydroxyethoxyl celluloses of the desired viscosities.

A capacitor is prepared utilizing a barium titanate based dielectric, conventional capacitor manufacturing techniques, and the metal flake particles of this invention. The milled metal flake particles were deposited at about 8.5 milligrams per square inch of dielectric.

The resultant capacitor was tested and found to have the desired capacitance.

EXAMPLE II

The procedure of Example I was repeated except that instead of forming the alloy flakes as described therein, an alloy was attempted to be prepared by a conventional co-precipitation technique, utilizing silver nitrate and palladium chloride as the source of the palladium and silver. Thereafter, the material was lightly milled and classified in accordance with standard techniques.

When a capacitor was prepared using 8.5 milligrams of metal per square inch, the capacitor was tested and found to be ineffective i.e. greatly reduced or no capacitance.

To prepare a capacitor equivalent to that prepared in Example I, 14 milligrams per square inch of metal had to be deposited on the dielectric material. Accordingly, the procedure of the present invention reduced the amount of metal needed to form an equivalent capacitor by about 39 percent.

EXAMPLE III

The procedures of Examples I and II are repeated using (a) 20% silver/80% palladium, and (b) 100% palladium. Comparable reduced metal usage results are observed.

I claim:

1. A method of preparing a metal electrode for use in a multilayer capacitor having two or more electrodes of a conductive material comprising an alloy of at least two metals and a dielectric layer disposed between said electrodes, the method comprising forming an ingot of the metal alloy, shaving the ingot to form shavings having a thickness less than about 2 mils, milling the shavings in the presence of a solvent and a lubricant to produce flakes, removing said solvent and lubricant, dispersing the flakes having an average diameter less than about 5 microns and a thickness less than about 1 micron in a vehicle, applying the flakes in the vehicle to the dielectric layer to form a coating, and firing said coating at an elevated temperature for a sufficient time to form a uniform metal layer on said dielectric layer.

2. The method according to claim 1, wherein the flakes in the vehicle are applied to the dielectric layer by means of screen printing.

3. The method according to claim 1, wherein the conductive material comprises an alloy of silver and palladium.

4. The method according to claim 3, wherein the palladium of said alloy is present in an amount of about 10-90% by weight.

5. The method according to claim 3, wherein the alloy contains about 10-90% by weight palladium and about 90-10% by weight silver.

* * * * *